J. McDERMOTT.
Thill-Coupling.

No. 29,289.  Patented July 24, 1860.

Witnesses.
C. M. Yale
Wm. H. Harrison

Inventor.
J. McDermott
by atty Chas. G. Page

UNITED STATES PATENT OFFICE.

JOHN McDERMOTT, OF WASHINGTON, DISTRICT OF COLUMBIA.

COUPLING OF THILLS TO AXLES.

Specification of Letters Patent No. 29,289, dated July 24, 1860.

*To all whom it may concern:*

Be it known that I, JOHN McDERMOTT, of Washington, in the District of Columbia, have invented an Improvement in Shaft-Shackles, and that the following is a full, clear, and exact description of the principle or character which distinguishes it from all other things before known and of the usual manner of making, modifying, and using the same, reference being had to the accompanying drawings, of which—

Figure 1:
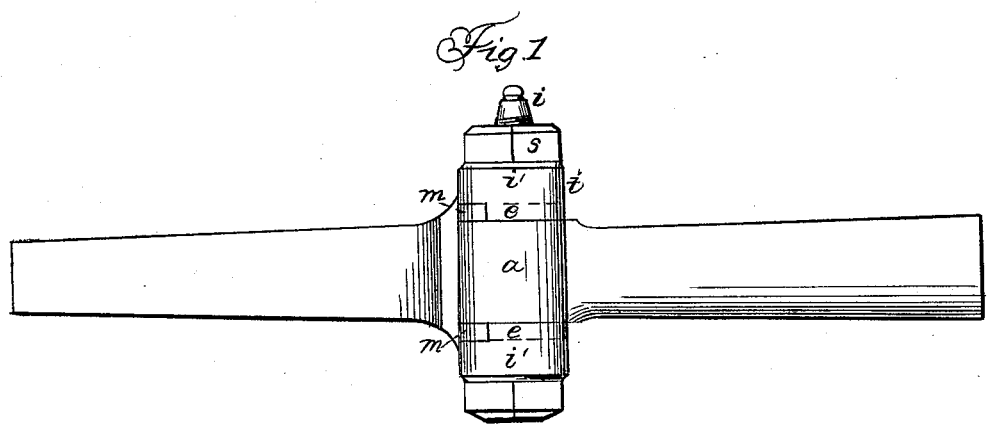
Figure 2:
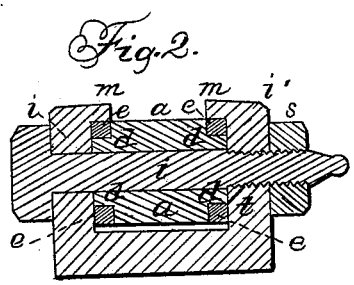
Figure 3:
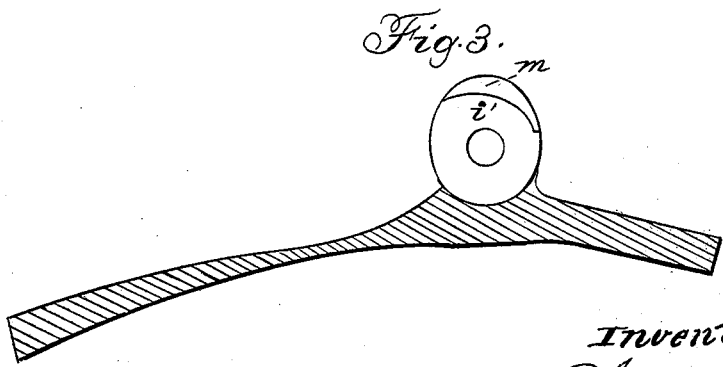

Figure 1, is a top view of the shackles or clip, Fig. 2 a cross section of the same, Fig. 3 a longitudinal section of the clip.

My invention consists in an improvement in attaching shafts of carriages to the clips described and represented as follows.

$a$ is the iron head of the shaft perforated with an eye as usual for the passage of the screw bolt $i$. Each end of this head is turned down to a shoulder or sleeve $d$, $d$, and upon these shoulders I put washers of suitable material preferring leather therefor.

In shaft shackles or clips the universal difficulty is the rapid wear of the parts in contact from the sand and grit from the roads, and the parts cannot well be made so closely-fitting as to exclude sand from the joints or rubbing surfaces. The end washers $e$, $e$ preserve a close bearing for a considerable length of time and as soon as worn are easily replaced. They also relieve the strain upon the iron cheeks $i'$, $i'$, and the guard flanges or curved segmental shoulders $m$, $m$. These flanges operate to check the forward motion of the iron head of the shaft and prevent the wear and strain on the bolt $i$. This bolt is held by a nut $s$, and is also screwed into the lug $t$ for greater security against displacement. The segmental guards extend only a short distance below and suffer whatever dust or grit that gets under the washer above, to work out below.

Although I prefer elastic washers $e$, $e$, yet metallic washers may be used and answer a good purpose for as they wear, new ones can be readily substituted.

What I claim as my invention and improvement in shaft shackles is—

1. The end washers $e$, $e$ upon the shoulders or sleeves $d$, $d$, of the shaft iron head as herein set forth.

2. The curved segmental shoulders or guards $m$, $m$, on the lugs of the clip in combination with said end washers and sleeves $d$ $d$, as set forth.

JOHN McDERMOTT.

Witnesses:
CHAS G. PAGE,
WM. H. HARRISON.